US010361764B2

(12) United States Patent
Nilsson et al.

(10) Patent No.: US 10,361,764 B2
(45) Date of Patent: Jul. 23, 2019

(54) DETERMINATION OF A PREFERRED BEAM IN A CELLULAR COMMUNICATION NETWORK EMPLOYING SIGNAL BEAMFORMING

(71) Applicant: Telefonaktiebolaget LM Ericsson (publ), Stockholm (SE)

(72) Inventors: Andreas Nilsson, Göteborg (SE); Henrik Asplund, Stockholm (SE); Fredrik Athley, Kullavik (SE); Niklas Jaldén, Enköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/753,362

(22) PCT Filed: Sep. 17, 2015

(86) PCT No.: PCT/EP2015/071380
§ 371 (c)(1),
(2) Date: Feb. 19, 2018

(87) PCT Pub. No.: WO2017/045721
PCT Pub. Date: Mar. 23, 2017

(65) Prior Publication Data

US 2018/0241456 A1 Aug. 23, 2018

(51) Int. Cl.
*H04L 5/12* (2006.01)
*H04B 7/06* (2006.01)
(Continued)

(52) U.S. Cl.
CPC ........... *H04B 7/0639* (2013.01); *H04B 7/043* (2013.01); *H04B 7/0619* (2013.01); *H04B 7/0617* (2013.01); *H04W 72/046* (2013.01)

(58) Field of Classification Search
CPC .... H04B 7/0639; H04B 7/043; H04B 7/0619; H04B 7/0617; H04W 72/046
(Continued)

(56) References Cited

U.S. PATENT DOCUMENTS

2013/0114425 A1 5/2013 Sayana et al.
2013/0229307 A1* 9/2013 Chang .................... H01Q 1/246 342/372

OTHER PUBLICATIONS

European Telecommunications Standards Institute, "LTE; Evolved Universal Terrestrial Radio Access (E-UTRA); Physical channels and modulation (3GPP TS 36.211 version 12.6.0 Release 12)", ETSI TS 136 211 V12.6.0, Jul. 2015, pp. 1-138.

* cited by examiner

*Primary Examiner* — Zewdu A Kassa
(74) *Attorney, Agent, or Firm* — Coats & Bennett, PLLC

(57) ABSTRACT

A method for acquiring an indication of a preferred beam of a wireless communication device is disclosed. The method is performed in a network node of a cellular communication network. The network node is adapted to support a plurality of beams of a signal beamforming scheme and to communicate with the wireless communication device using at least one beam of the plurality of beams. The method comprises acquiring a beam power setting of the plurality of beams. The beam power setting comprises a power offset being applied to at least one beam of the plurality of beams, the power offset being relative to a nominal power setting of the plurality of beams. The method also comprises transmitting (to the wireless communication device) a message indicative of the beam power setting, transmitting measurement signals, and receiving (from the wireless communication device) a report indicative of the preferred beam, wherein
(Continued)

110
111 NWN
151 UE
150
112 Acquire (e.g. determine or receive) beam power setting
114 Transmit message indicative of beam power setting
134
154 Receive message indicative of beam power setting
116 Transmit measurement signals
136
156 Perform measurements on measurement signals
158 Determine a preferred beam based on measurements and beam power setting
120 Receive report indicative of preferred beam
140
160 Transmit report indicative of preferred beam
122 Select beam for communication based on preferred beam the preferred beam is determined by the wireless communication device based on the measurement signals and the beam power setting.

15 Claims, 2 Drawing Sheets

(51) Int. Cl.
*H04B 7/0426* (2017.01)
*H04W 72/04* (2009.01)

(58) Field of Classification Search
USPC ........ 375/362, 361, 360, 359, 316, 295, 219
See application file for complete search history.

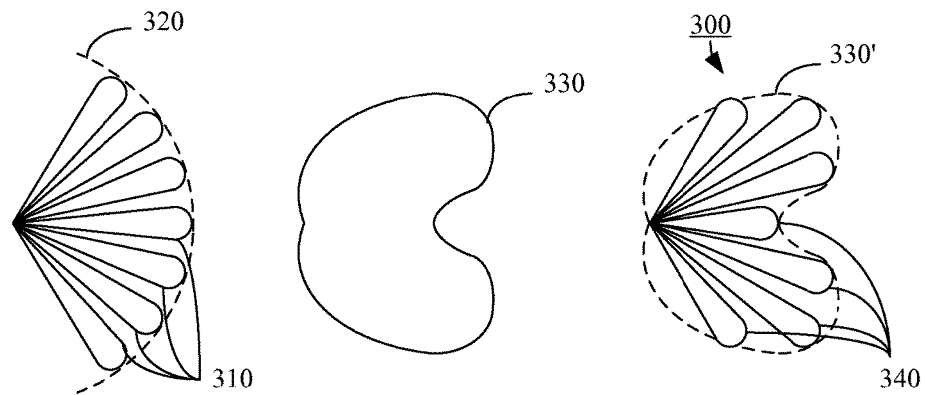
FIG. 3
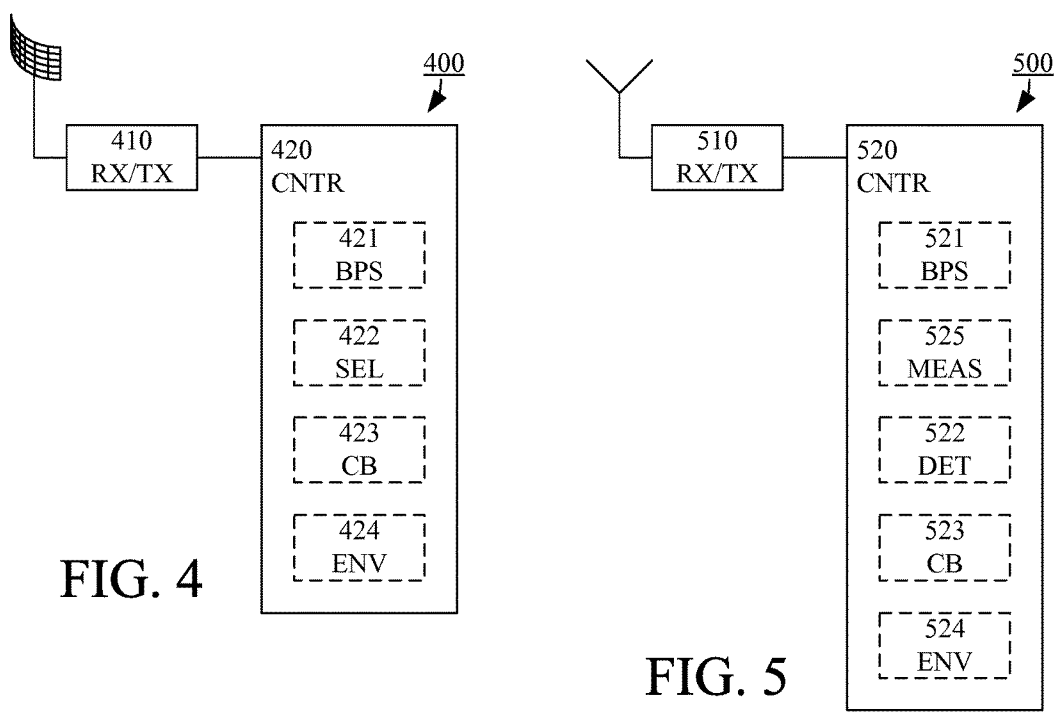
FIG. 4
FIG. 5
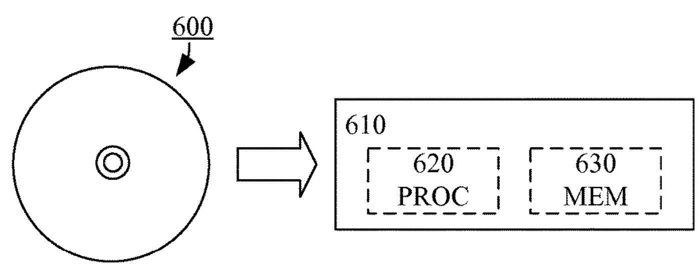
FIG. 6

DETERMINATION OF A PREFERRED BEAM IN A CELLULAR COMMUNICATION NETWORK EMPLOYING SIGNAL BEAMFORMING

TECHNICAL FIELD

The present invention relates generally to the field of signal beam-forming in cellular communication systems. More particularly, it relates to determination of a preferred beam in such systems.

BACKGROUND

Beam-forming is a well-known technique in the field of wireless communication. It may, for example, be used for improving the signal-to-noise ratio (SNR) for a communication link by steering the transmitted energy in, or collecting the received energy from, a favorable direction. As referred to herein, beam-forming may conceptually be accomplished by any suitable known or future techniques, and applicable details of those techniques will not be elaborated on further.

Determining which beam should preferably be used (e.g. an optimal beam or a sufficiently good beam according to some criteria) in a particular situation and scenario may be challenging, especially if a large number of antenna elements and high beam-forming resolution is applied. In a typical implementation of a system using beam-forming, a receiving device may perform measurements of reference signals sent from a transmitting device and feed back measurement results (e.g. a preferred beam).

Precoding is a kind of beam-forming that supports multi-layer transmission in multi-antenna radio systems, such as multiple-input multiple-output (MIMO) radio systems, and is relevant in relation to, for example, the 3GPP (Third Generation Partnership Project) standard Universal Mobile Telecommunication Standard, Long Term Evolution (UMTS-LTE).

Closed loop MIMO precoding is a MIMO approach where each of the multiple streams are emitted from the transmit antennas (e.g. at a base station or other network node) with independent and appropriate weighting per each antenna such that the throughput is ideally maximized between the transmitting device and the receiving device (e.g. a user equipment (UE) of UMTS-LTE). The precoding weights that should be used are typically calculated based on measurements at the receiving device and communicated to the transmitting device in a similar manner as explained above.

Usually, only a limited number of (predefined) precoding weights are used. The collection of precoding weights is called a codebook. In closed loop MIMO precoding, the codebook is typically known at both the transmitting and the receiving device. Hence, communication of preferred precoding weights by the receiving device may simply comprise indicating the index that the preferred precoding weights have in the codebook. This is typically done by sending a number which is usually called the Precoding Matrix Indicator (PMI).

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It should also be noted that even though precoding and/or MIMO may be used herein to exemplify various embodiments, this is not to be construed as limiting. Contrarily, embodiments may be equally applicable to any beam-forming scenario with feed-back information from a receiving device.

It is an object of some embodiments to provide a more flexible beam-forming system.

According to a first aspect, this is achieved by a method for acquiring an indication of a preferred beam of a wireless communication device, performed in a network node of a cellular communication network.

The network node is adapted to support a plurality of beams of a signal beam-forming scheme and to communicate with the wireless communication device using at least one beam of the plurality of beams.

The method comprises acquiring a beam power setting of the plurality of beams, wherein the beam power setting comprises a power offset being applied to at least one beam of the plurality of beams, the power offset being relative to a nominal power setting of the plurality of beams.

The method also comprises transmitting (to the wireless communication device) a message indicative of the beam power setting and transmitting measurement signals.

The method further comprises receiving (from the wireless communication device) a report indicative of the preferred beam, wherein the preferred beam is determined by the wireless communication device based on the measurement signals and the beam power setting.

In some embodiments, the beam power setting may comprise a power offset value per beam in the plurality of beams.

In some embodiments, the plurality of beams may be grouped into a plurality of groups, and the beam power setting may comprise a power offset value per group.

The power offset values may comprise any suitable value. For example, one power offset value may be equal to zero (resulting in the nominal power setting for a beam where that power offset value is applied), and/or one power offset value may be equal to minus the nominal power setting (resulting in that a beam where that power offset value is applied is not transmitted—zero power). In some embodiments, the power offset values comprise a collection of quantized values between a minimum power offset value and a maximum power offset value. According to some embodiments, the minimum power offset value is not less than minus the nominal power setting and/or the maximum power offset value is not larger than zero.

The measurement signals may be transmitted using the nominal power setting, or any other suitable power setting.

The measurement signals may, for example, comprise reference signals such as a cell-specific reference signal (CRS) or a channel-state information reference signal (CSI-RS).

According to some embodiments, the method may further comprise selecting one beam out of the plurality of beams for communication with the wireless communication device based on the received report. For example, the method may comprise selecting the preferred beam for communication with the wireless communication device.

The beam power setting may comprise any suitable beam power setting.

In some embodiments, the beam power setting may approximate a cell radiation power profile of the network node. For example, the beam power setting may be determined by assigning, to each beam in the plurality of beams, a power offset value that results in a power setting which is closest to (a possibly scaled version of) the value of the cell radiation power profile in the direction of the beam. The cell radiation power profile may be defined as the angular power radiation pattern used for transmission of non-user specific signals.

In some embodiments, the beam power setting may comprise beams having a power setting that is lower than the nominal power setting if having a direction within a particular angle range.

The particular angle range may be defined in terms of elevation, azimuth or a combination thereof. The particular angle range may comprise an angle corresponding to a bearing from the network node to a horizon according to some embodiments. Alternatively or additionally, the particular angle range may comprise an angle corresponding to a bearing from the network node to a location of a wireless communication device served by a neighboring network node of the cellular communication system according to some embodiments. The location of the wireless communication device served by a neighboring network node of the cellular communication system may, for example, be a probable location, an approximate location, or an actual location.

The direction of a beam may, typically, be defined as the direction of the maximum power emission of the beam. According to such a definition, a beam directed 30 degrees below the horizon and having a beam width of 90 degrees does not fall within an angle range spanning from 10 degrees above to 10 degrees below the horizon even though the angle range falls within the beam width.

Other beam power settings than those exemplified above are also possible.

The message indicative of the beam power setting may have any suitable form and may carry the indication of the beam power setting in any suitable way.

According to some embodiments, the message indicative of the beam power setting comprises a value of the power offset (i.e. a relative power value, a power offset value) or an indication thereof. The value of the power offset may be quantized. The value of the power offset may be per beam, per group, or otherwise. In some embodiments, (vertical and/or azimuth) angular segments are defined and the message indicative of the beam power setting comprises a value of the power offset per angular segment.

According to some embodiments, the message indicative of the beam power setting comprises a power value (i.e. an absolute power value) or an indication thereof. The power value may be quantized. The power value may be per beam, per group, or otherwise. In some embodiments, (vertical and/or azimuth) angular segments are defined and the message indicative of the beam power setting comprises a power value per angular segment.

In some embodiments, the beam power setting may be according to a power envelope of a plurality of predetermined power envelopes. Then, the message indicative of the beam power setting may comprise an envelope index identifying the power envelope. Each of the predefined power envelopes may comprise a spatial power radiation pattern. For example, the plurality of predefined power envelopes may comprise scaled versions of the cell radiation power profile.

According to some embodiments, an extended precoding codebook comprises a plurality of versions of a nominal precoding codebook defining the plurality of beams having the nominal power setting, wherein the plurality of versions define different power offset values. In such embodiments, the message indicative of the beam power setting may comprise indices identifying a subset of entries of the extended precoding codebook.

A second aspect is a method for determining a preferred beam, performed in a wireless communication device adapted to communicate with a network node of a cellular communication network.

The network node is adapted to support a plurality of beams of a signal beam-forming scheme and to communicate with the wireless communication device using at least one beam of the plurality of beams.

The method comprises receiving (from the network node) a message indicative of a beam power setting of the plurality of beams, wherein the beam power setting comprises a power offset being applied to at least one beam of the plurality of beams, the power offset being relative to a nominal power setting of the plurality of beams.

The method also comprises performing measurements on measurement signals transmitted by the network node, determining the preferred beam based on the measurements and the beam power setting, and transmitting (to the network node) a report indicative of the preferred beam.

The message indicative of the beam power setting may comprise a value of the power offset according to some embodiments.

In some embodiments, the beam power setting may be according to a power envelope of a plurality of predetermined power envelopes and the message indicative of the beam power setting may comprise an envelope index identifying the power envelope.

According to some embodiments, determining the preferred beam may comprise compensating the measurements based on the beam power setting and selecting the preferred beam based on the compensated measurements.

For example, the measurements relating to a particular beam may be scaled based on the power offset value of that beam in the beam power setting (e.g. using a scaling factor which is, at least approximately, equal to one plus a ratio of the power offset to the nominal power setting). Then the scaled measurements may be used to determine the preferred beam according to any suitable approach (e.g. a currently used approach).

Alternatively, a (temporary) scaled codebook may be created from a nominal codebook based on the power offset values of the beam power setting and used instead of the nominal precoding codebook when determining the preferred beam based on the measurements.

In some embodiments, an extended precoding codebook may comprise a plurality of versions of a nominal precoding codebook defining the plurality of beams having the nominal power setting, wherein the plurality of versions define different power offset values. Then, the message indicative of the beam power setting may comprise indices identifying a subset of entries of the extended precoding codebook.

In the latter embodiments, the subset of entries of the extended precoding codebook may be used instead of the nominal precoding codebook when determining the preferred beam based on the measurements.

In some embodiments, the second aspect may additionally have features identical with or corresponding to any of the various features as explained above for the first aspect, and vice versa.

A third aspect is a computer program product comprising a computer readable medium, having thereon a computer program comprising program instructions. The computer program is loadable into a data-processing unit and adapted to cause execution of the method according to any of the first and second aspects when the computer program is run by the data-processing unit.

A fourth aspect is an arrangement for acquiring an indication of a preferred beam of a wireless communication device, the arrangement being for a network node of a cellular communication network, wherein the network node is adapted to support a plurality of beams of a signal beam-forming scheme and to communicate with the wireless communication device using at least one beam of the plurality of beams.

The arrangement comprises a controller adapted to cause acquiring of a beam power setting of the plurality of beams, wherein the beam power setting comprises a power offset being applied to at least one beam of the plurality of beams, the power offset being relative to a nominal power setting of the plurality of beams.

The controller is also adapted to cause transmission (to the wireless communication device) of a message indicative of the beam power setting, and transmission of measurement signals.

The controller is further adapted to cause reception (from the wireless communication device) of a report indicative of the preferred beam, wherein the preferred beam is determined by the wireless communication device based on the measurement signals and the beam power setting.

In some embodiments, the arrangement may further comprise a transmitter adapted to transmit the message indicative of the beam power setting and the measurement signals, and a receiver adapted to receive the report indicative of the preferred beam.

In some embodiments, the fourth aspect may additionally have features identical with or corresponding to any of the various features as explained above for the first aspect.

A fifth aspect is a network node for a cellular communication network (the network node adapted to support a plurality of beams of a signal beam-forming scheme and to communicate with a wireless communication device using at least one beam of the plurality of beams) wherein the network node comprises the arrangement of the fourth aspect.

A sixth aspect is an arrangement for determination of a preferred beam, the arrangement being for a wireless communication device adapted to communicate with a network node of a cellular communication network.

The network node is adapted to support a plurality of beams of a signal beam-forming scheme and to communicate with the wireless communication device using at least one beam of the plurality of beams.

The arrangement comprises a controller adapted to cause reception (from the network node) of a message indicative of a beam power setting of the plurality of beams, wherein the beam power setting comprises a power offset being applied to at least one beam of the plurality of beams, the power offset being relative to a nominal power setting of the plurality of beams.

The controller is also adapted to cause measurements being performed on measurement signals transmitted by the network node, determination of the preferred beam based on the measurements and the beam power setting, and transmission (to the network node) of a report indicative of the preferred beam.

In some embodiments, the arrangement may further comprise a transmitter adapted to transmit the report indicative of the preferred beam and a receiver adapted to receive the message indicative of the beam power setting.

In some embodiments, the sixth aspect may additionally have features identical with or corresponding to any of the various features as explained above for the second aspect.

A seventh aspect is a wireless communication device adapted to communicate with a network node of a cellular communication network (wherein the network node is adapted to support a plurality of beams of a signal beam-forming scheme and to communicate with the wireless communication device using at least one beam of the plurality of beams) wherein the wireless communication device comprises the arrangement of the sixth aspect.

An eighth aspect is a cellular communication network comprising at least one network node according to the fifth aspect and adapted to operate in association with at least one wireless communication device according to the seventh aspect.

An advantage of some embodiments is that a flexible beam-forming system is enabled. For example, due to the indication of the beam power setting from the network node to the wireless communication device and the determination by the wireless communication device of the preferred beam based on the beam power setting it is possible to have a dynamic beam power setting and still get accurate preferred beam reports.

Another advantage of some embodiments is that system performance will be improved compared to a system where all beams use the nominal power setting. The system performance will also be improved compared to a system where power offsets may be applied to one or more beams and the wireless communication device assumes nominal power setting when determining the preferred beam.

Yet another advantage of some embodiments is that the amount of overhead signaling is fairly low. This is particularly true for the embodiments where the indication of the beam poser setting comprises an envelope index.

BRIEF DESCRIPTION OF THE DRAWINGS

Further objects, features and advantages will appear from the following detailed description of embodiments, with reference being made to the accompanying drawings, in which:

FIG. 3 is a schematic drawing illustrating example beam-forming according to some embodiments;

FIG. 4 is a block diagram illustrating an example arrangement according to some embodiments;

FIG. 5 is a block diagram illustrating an example arrangement according to some embodiments; and FIG. 6 is a schematic drawing illustrating a computer readable medium according to some embodiments.

DETAILED DESCRIPTION

In the following, embodiments will be described where flexible beam-forming is enabled.

Studies have shown that controlling the power used by each beam of a beam-forming system may improve the overall performance of the system.

For example, it may be beneficial to reduce the power used by a beam that is directed towards a wireless communication device served by a neighboring network node (and thereby experiencing the power of that beam as interference), or to completely avoid using such beams. Removing some precoding vectors from a codebook can be done in UMTS-LTE by using codebook subset restriction as specified in 3GPP technical specification 36.211 version 12.6.0.

The location of wireless communication devices served by neighboring network nodes may be determined explicitly, approximately, or probability-wise (e.g. based on statistics). Alternatively or additionally, beams directed (at least approximately) towards the horizon may use a reduced power setting.

Of course, numerous other beam power settings are possible. Furthermore, the beam power setting may be changed dynamically as conditions changes.

Determining which beam should preferably be used for communication (e.g. an optimal beam or a sufficiently good beam according to some criteria) in a particular situation and scenario may be challenging. In a typical implementation of a system using beam-forming, a receiving device may perform measurements of reference signals sent from a transmitting device and feed back measurement results (e.g. a preferred beam).

If the wireless communication device potentially receiving the prospect transmission of a beam presumes a nominal beam power setting when determining which beam it prefers, the determination of the preferred beam might be sub-optimal if the beam—once selected—is transmitted using an other than nominal power setting. For example, using a nominal precoding codebook when determining the preferred beam might results in a non-optimal PMI report.

Thus, to adequately determine the preferred beam the wireless communication device needs information regarding the beam power setting to be used for the beam-forming transmission. This information is, according to embodiments described herein, conveyed from the network node to the wireless communication device via a message indicative of the beam power setting.

Figure 1:
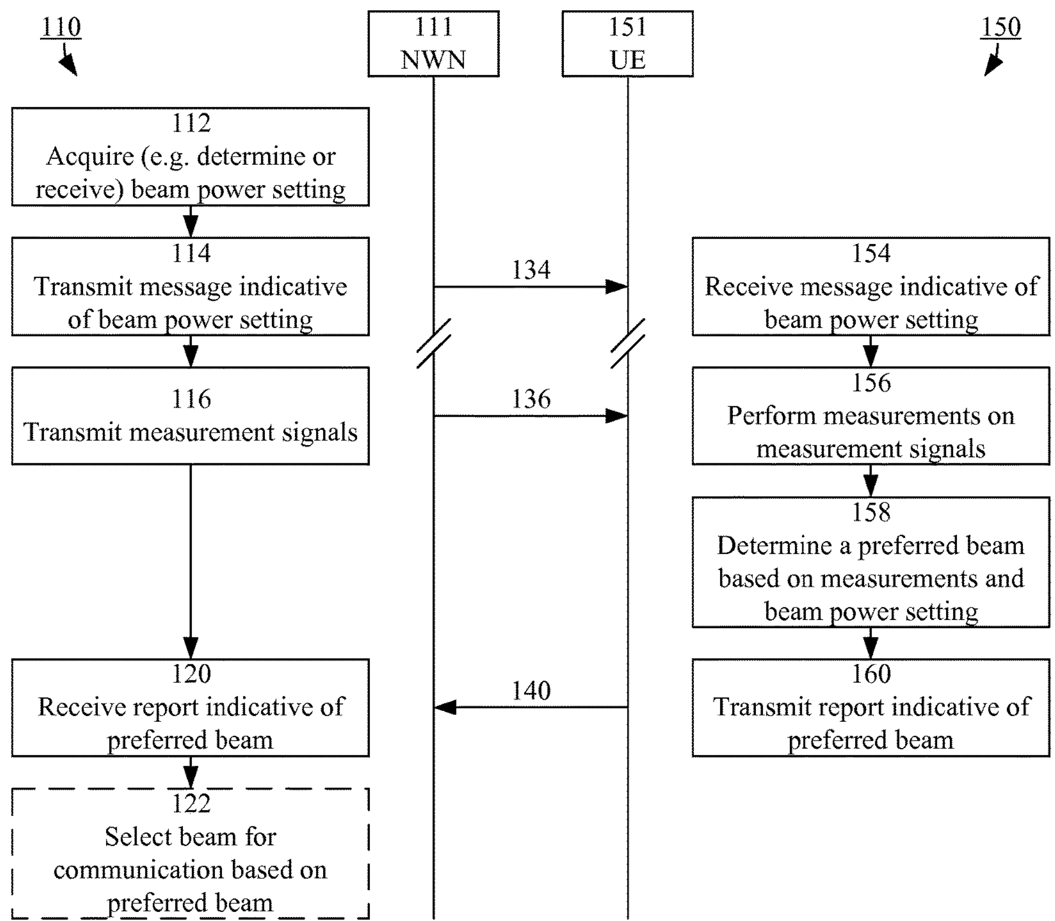
FIG. 1 is a combined flowchart and signaling diagram illustrating example method steps and signals according to some embodiments.

FIG. 1 illustrates example methods 110, 150 carried out by, respectively, a network node (NWN) 111 of a cellular communication network and a wireless communication device (WCD) 151 and signals sent them between according to some embodiments.

The network node 111 is adapted to support a plurality of beams of a signal beam-forming scheme and to communicate with the wireless communication device 151 using at least one beam of the plurality of beams. It is assumed that the network node applies a beam power setting in which a power offset (which may be zero) relative to a nominal power setting is applied to at least one beam of the plurality of beams.

The method 110 is for acquiring an indication of a preferred beam of the wireless communication device and the method 150 is for determining a preferred beam.

Of course, method 150 is also applicable for determining more than one preferred beam, i.e., a set of beams which fulfill some pre-determined preferred beam criteria.

In step 112, the network node acquires (e.g. determines autonomously or receives information about) a beam power setting of the plurality of beams.

As elaborated on above, there are numerous variations to the beam power setting. For example, the beam power setting may comprise beams having a power setting that is lower than the nominal power setting if having a direction within a particular angle range. The particular angle range may comprise an angle corresponding to a bearing from the network node to a location of a wireless communication device served by a neighboring network node of the cellular communication system. Alternatively or additionally, the beam power setting may approximate a cell radiation power profile of the network node.

A message 134 indicative of the beam power setting is transmitted by the network node 111 in step 114 and received by the wireless communication device in step 154. This message may be communicated when the wireless communication device registers at the network node, when the beam power setting changes, at regular intervals, and/or at any other suitable point in time.

As elaborated on above, there are numerous variations to the message indicative of the beam power setting. For example, the message 134 may comprise a (quantized) value of the power offset, an envelope index identifying one of a plurality of predetermined power envelopes, or indices identifying a subset of entries of an extended precoding codebook.

In step 116, the network node 111 transmits measurement signals 136. The measurement signals may be any signals suitable for measurement, for example, reference signals (CSI-RS or CRS) or some other non-dedicated signals. Typically, but not necessarily, the measurements signals are transmitted using the same transmit power.

The wireless communication device 151 performs measurements on the measurement signals in step 156 and determines a preferred beam in step 158 based on the measurements and the beam power setting.

As elaborated on above, determining the preferred beam may comprise compensating (e.g. scaling) the measurements based on the beam power setting and selecting the preferred beam based on the compensated measurements, or using a subset of entries of an extended precoding codebook when selecting the preferred beam based on the measurements.

The wireless communication device 151 transmits a report 140 (e.g. a PMI report) indicative of the preferred beam in step 160, which report is received by the network node 111 in step 120.

The network node 111 may use the received report to select one of the plurality of beams (e.g. the preferred beam) for communication with the wireless communication device as illustrated by step 122.

Figure 2:
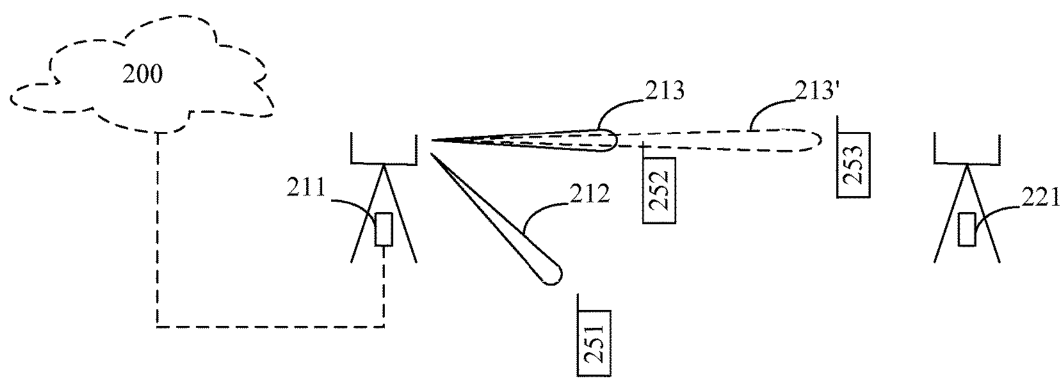
FIG. 2 is a schematic drawing illustrating example scenarios according to some embodiments.

FIG. 2 illustrates an example scenario where some embodiments may be applicable. A network node 211 communicates with two wireless communication devices 251, 252 using the beams 212 and 213, respectively, and a neighboring network node 221 communicates with a wireless communication device 253.

FIG. 2 illustrates a situation where the wireless communication device 253 communicating with the neighboring network node 221 experiences the beam 213 as interference (illustrated by 213') since the beam 213 is directed towards the wireless communication device 253. In such a situation, it may be beneficial to let the beam 213 use a lower power level than the beam 212 to reduce interference in the system and improve overall performance.

A cloud service 200, adapted to communicate with the network node 211 is also illustrated in FIG. 2. The cloud service may, for example, provide location information regarding wireless communication devices and/or determine and provide the beam power setting.

FIG. 3 illustrates example beam-forming according to some embodiments. A nominal beam power setting with equal power 320 for all beams 310 is illustrated in the left part of the figure. The middle part of the figure shows a power envelope 330, which may, for example be a cell radiation pattern. The right part of the figure illustrates how offsets may be applied to the beams 340 to achieve a beam power setting 300 which has (approximately) the same shape as (a possibly scaled version of) the power envelope 330'.

FIG. 4 illustrates an example arrangement 400 for a network node of a cellular communication network according to some embodiments. The network node may, for example, be the network node 111 of FIG. 1 and is adapted to support a plurality of beams of a signal beam-forming scheme and to communicate with a wireless communication device using at least one beam of the plurality of beams.

The arrangement 400 is for acquiring an indication of a preferred beam of a wireless communication device and comprises a controller (CNTR) 420 adapted to cause execution of the method 110 as described in connection to FIG. 1.

The arrangement 400 may also comprise a transmitter and a receiver (illustrated in FIG. 4 as a transceiver (RX/TX) 410) adapted to transmit the message indicative of the beam power setting and the measurement signals (compare, respectively, with steps 114 and 116 of FIG. 1), and receive the report indicative of the preferred beam (compare with step 120 of FIG. 1).

The controller 420 may comprise various modules to cause the execution of the method 110. For example, the controller 420 may comprise one or more of a beam power setting module (BPS) 421, a beam selector (SEL) 422, a codebook module (CB) 423, and a power envelope module (ENV) 424.

The beam power setting module 421 may be adapted to acquire (e.g. determine or receive) and store the beam power setting to be applied (compare with step 112 of FIG. 1).

The selector 422 may be adapted to select the beam to be used for communication based on the received report (compare with step 122 of FIG. 1).

The codebook module 423 may be adapted to store a (possibly extended) codebook. Alternatively or additionally, the codebook module 423 may be adapted to determine indices defining a subset of an extended codebook based on the beam power profile to be used.

The power envelope module 424 may be adapted to store a collection of predetermined power envelopes. Alternatively or additionally, the power envelope module 424 may be adapted to determine an index defining a power envelope based on the beam power profile to be used.

FIG. 5 illustrates an example arrangement 500 for a wireless communication device according to some embodiments. The wireless communication device may, for example, be the wireless communication device 151 of FIG. 1 and is adapted to communicate with a network node supporting a plurality of beams of a signal beam-forming scheme.

The arrangement 500 is for determining a preferred beam of the wireless communication device and comprises a controller (CNTR) 520 adapted to cause execution of the method 150 as described in connection to FIG. 1.

The arrangement 500 may also comprise a transmitter and a receiver (illustrated in FIG. 5 as a transceiver (RX/TX) 510) adapted to receive the message indicative of the beam power setting (compare with step 154 of FIG. 1), and transmit the report indicative of the preferred beam (compare with step 160 of FIG. 1).

The controller 520 may comprise various modules to cause the execution of the method 150. For example, the controller 520 may comprise one or more of a beam power setting module (BPS) 521, a measurement module (MEAS) 525, a preferred beam determiner (DET) 522, a codebook module (CB) 523, and a power envelope module (ENV) 524.

The beam power setting module 521 may be adapted to store the received beam power setting (compare with step 112 of FIG. 1).

The measurement module 525 may be adapted to perform measurements (compare with step 156 of FIG. 1).

The preferred beam determiner 522 may be adapted to determine a preferred beam based on the measurements and the beam power setting (compare with step 158 of FIG. 1) according to any approach described above.

The codebook module 523 may be adapted to store a (possibly extended) codebook. Alternatively or additionally, the codebook module 523 may be adapted to provide a subset of an extended codebook based on the received beam power setting.

The power envelope module 524 may be adapted to store a collection of predetermined power envelopes. Alternatively or additionally, the power envelope module 524 may be adapted to provide a power envelope based on the received beam power setting.

Three different examples of how the message indicative of the beam power setting may be implemented will now be given.

In the first example, an extended codebook is created that comprise multiple versions of a nominal codebook, where each version has different power offset from the nominal power (power offset zero). In this example, the codebook subset restriction functionality already available in UMTS-LTE may be used to select a subset of the extended codebook such that the subset (at least approximately) matches the beam power setting to be used. In this way, the wireless communication device will implicitly receive the beam power setting and can make an accurate determination of the preferred beam.

The extended codebook could be standardized and would then be implemented in all wireless communication devices and network nodes. Alternatively, the extended codebook could be implemented in network nodes and the network nodes could signal during operation how the extended codebook should be designed. For example, the network node could signal a number of power offsets to be applied to the nominal codebook. An advantage with the former solution is that no extra signaling is needed to define the extended codebook. An advantage with the latter solution is that the beam power setting is less restrictive; the network node can use power offsets that it actually needs to, for example, get a desired shape of the envelope of the beams.

In the second example, the network node signals the power offset used for each beam to the wireless communication device. Thus, the network node may inform the wireless communication device about deviation (offset) of the power setting from the nominal power setting for respective beams. In order to reduce the overhead signaling it is preferred that the power offsets are quantized. For example, if the network node uses four different power settings per beam, it is enough to signal 2 bits per beam to inform the wireless communication device.

According to some aspects, the used beam power setting is assumed to be rather static in time. In such cases, the signaling of the power offset typically has to be done only once (or very seldom) per wireless communication device. If the beam power setting is the same for all wireless communication devices of a cell, the signaling of the power offset may even be done only once (or very seldom) per cell (e.g. via broadcast). Hence, this approach does not require much signaling overhead.

In the third example, envelope shapes of the beams are defined. For example, each envelope shape may have a certain power offset for respective PMI. The envelope shapes and their corresponding power offset per PMI is known both at the network node and at the wireless communication device. Thus, the network node only has to inform the wireless communication device about which envelope shape is applied. This solution typically requires very little overhead signaling at the expense of being less flexible than the second example.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device or a network node) comprising circuitry/logic or performing methods according to any of the embodiments.

According to some embodiments, a computer program product comprises a computer readable medium such as, for example, a USB-stick, a plug-in card, an embedded drive, or a read-only memory (ROM) such as the CD-ROM 600 illustrated in FIG. 6. The computer readable medium may have stored thereon a computer program comprising program instructions. The computer program may be loadable into a data-processing unit (PROC) 620, which may, for example, be comprised in a wireless communication device or a network node 610. When loaded into the data-processing unit, the computer program may be stored in a memory (MEM) 630 associated with or integral to the data-processing unit. According to some embodiments, the computer program may, when loaded into and run by the data-processing unit, cause the data-processing unit to execute method steps according to, for example, any of the methods shown in FIG. 1.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A method, performed in a network node of a cellular communication network, for acquiring an indication of a preferred downlink transmit beam of a wireless communication device for downlink transmissions from the network node, wherein the network node is configured to support a plurality of beams of a signal beam-forming scheme and to communicate with the wireless communication device using at least one downlink transmit beam of the plurality of beams, the method comprising:
- acquiring a beam power setting of the plurality of beams, wherein the beam power setting comprises a power offset being applied at the network node to at least one downlink transmit beam of the plurality of beams for downlink transmissions from the network node, the power offset being relative to a nominal power setting of the plurality of beams;
- transmitting, to the wireless communication device, a message indicative of the beam power setting;
- transmitting measurement signals; and
- receiving, from the wireless communication device, a report indicative of the preferred downlink transmit beam, wherein the preferred downlink transmit beam is determined by the wireless communication device based on the measurement signals and the beam power setting.

2. The method of claim 1, further comprising selecting one downlink transmit beam out of the plurality of beams for downlink communication with the wireless communication device based on the received report.

3. The method of claim 1, wherein the beam power setting approximates a cell radiation power profile of the network node.

4. The method of claim 1, wherein the beam power setting comprises beams having a power setting that is lower than the nominal power setting if having a direction within a particular angle range.

5. The method of claim 4, wherein the particular angle range comprises an angle corresponding to a bearing from the network node to a location of a wireless communication device served by a neighboring network node of the cellular communication system.

6. The method of claim 1, wherein the message indicative of the beam power setting comprises a value of the power offset.

7. The method of claim 1:
- wherein an extended precoding codebook comprises a plurality of versions of a nominal precoding codebook defining the plurality of beams having the nominal power setting, wherein the plurality of versions define different power offset values; and
- wherein the message indicative of the beam power setting comprises indices identifying a subset of entries of the extended precoding codebook.

8. A method for determining a preferred downlink transmit beam, performed in a wireless communication device adapted to communicate with a network node of a cellular communication network, wherein the network node is configured to support a plurality of beams of a signal beam-forming scheme and to communicate with the wireless communication device using at least one downlink transmit beam of the plurality of beams, the method comprising the wireless communication device:

receiving, from the network node, a message indicative of a beam power setting of the plurality of beams, wherein the beam power setting comprises a power offset being applied at the network node to at least one downlink transmit beam of the plurality of beams for downlink transmissions from the network node, the power offset being relative to a nominal power setting of the plurality of beams;

performing measurements on measurement signals transmitted by the network node;

determining the preferred downlink transmit beam based on the measurements and the beam power setting; and transmitting, to the network node, a report indicative of the preferred downlink transmit beam.

9. The method of claim 8, wherein the determining the preferred downlink transmit beam comprises:

compensating the measurements based on the beam power setting; and selecting the preferred downlink transmit beam based on the compensated measurements.

10. The method of claim 8:

wherein an extended precoding codebook comprises a plurality of versions of a nominal precoding codebook defining the plurality of beams having the nominal power setting, wherein the plurality of versions define different power offset values; and wherein the message indicative of the beam power setting comprises indices identifying a subset of entries of the extended precoding codebook.

11. A non-transitory computer readable recording medium storing a computer program product for controlling a network node of a cellular communication network for acquiring an indication of a preferred downlink transmit beam of a wireless communication device for downlink transmissions from the network node, wherein the network node is configured to support a plurality of beams of a signal beam-forming scheme and to communicate with the wireless communication device using at least one downlink transmit beam of the plurality of beams, the computer program product comprising software instructions which, when run on processing circuitry of the network node, causes the network node to:

acquire a beam power setting of the plurality of beams, wherein the beam power setting comprises a power offset being applied at the network node to at least one downlink transmit beam of the plurality of beams for downlink transmissions from the network node, the power offset being relative to a nominal power setting of the plurality of beams;

transmit, to the wireless communication device, a message indicative of the beam power setting;

transmit measurement signals; and receive, from the wireless communication device, a report indicative of the preferred downlink transmit beam, wherein the preferred downlink transmit beam is determined by the wireless communication device based on the measurement signals and the beam power setting.

12. A non-transitory computer readable recording medium storing a computer program product for determining a preferred downlink transmit beam by a wireless communication device adapted to communicate with a network node of a cellular communication network, wherein the network node is configured to support a plurality of beams of a signal beam-forming scheme and to communicate with the wireless communication device using at least one downlink transmit beam of the plurality of beams, the computer program product comprising software instructions which, when run on processing circuitry of the wireless communication device, causes the wireless communication device to:

receive, from the network node, a message indicative of a beam power setting of the plurality of beams, wherein the beam power setting comprises a power offset being applied at the network node to at least one downlink transmit beam of the plurality of beams for downlink transmissions from the network node, the power offset being relative to a nominal power setting of the plurality of beams;

perform measurements on measurement signals transmitted by the network node;

determine the preferred downlink transmit beam based on the measurements and the beam power setting; and transmit, to the network node, a report indicative of the preferred downlink transmit beam.

13. An arrangement for acquiring an indication of a preferred downlink transmit beam of a wireless communication device, the arrangement being for a network node of a cellular communication network, wherein the network node is adapted to support a plurality of beams of a signal beam-forming scheme and to communicate with the wireless communication device using at least one downlink transmit beam of the plurality of beams, the arrangement comprising:

processing circuitry;

memory containing instructions executable by the processing circuitry whereby the arrangement is operative to:

acquire of a beam power setting of the plurality of beams, wherein the beam power setting comprises a power offset being applied at the network node to at least one downlink transmit beam of the plurality of beams for downlink transmissions from the network node, the power offset being relative to a nominal power setting of the plurality of beams;

transmit, to the wireless communication device, a message indicative of the beam power setting;

transmit measurement signals; and receive, from the wireless communication device, of a report indicative of the preferred downlink transmit beam, wherein the preferred downlink transmit beam is determined by the wireless communication device based on the measurement signals and the beam power setting.

14. An arrangement for determination of a preferred downlink transmit beam, the arrangement being for a wireless communication device adapted to communicate with a network node of a cellular communication network, wherein the network node is adapted to support a plurality of beams of a signal beam-forming scheme and to communicate with the wireless communication device using at least one downlink transmit beam of the plurality of beams, the arrangement comprising:

processing circuitry;

memory containing instructions executable by the processing circuitry whereby the arrangement is operative to:

receive, from the network node, of a message indicative of a beam power setting of the plurality of beams, wherein the beam power setting comprises a power offset being applied at the network node to at least one downlink transmit beam of the plurality of beams for downlink transmissions from the network node, the power offset being relative to a nominal power setting of the plurality of beams;

perform measurements on measurement signals transmitted by the network node;

determine of the preferred downlink transmit beam based on the measurements and the beam power setting; and transmit, to the network node, of a report indicative of the preferred downlink transmit beam.

15. A wireless communication device adapted to communicate with a network node of a cellular communication network, wherein the network node is adapted to support a plurality of beams of a signal beam-forming scheme and to communicate with the wireless communication device using at least one downlink transmit beam of the plurality of beams, the wireless communication device comprising:

processing circuitry;

memory containing instructions executable by the processing circuitry whereby the wireless communication device is operative to:

receive, from the network node, of a message indicative of a beam power setting of the plurality of beams, wherein the beam power setting comprises a power offset being applied at the network node to at least one downlink transmit beam of the plurality of beams for downlink transmissions from the network node, the power offset being relative to a nominal power setting of the plurality of beams;

perform measurements on measurement signals transmitted by the network node;

determine of a preferred downlink transmit beam based on the measurements and the beam power setting; and transmit, to the network node, of a report indicative of the preferred downlink transmit beam.

* * * * *